US010537816B2

(12) United States Patent
Arias, IV

(10) Patent No.: US 10,537,816 B2
(45) Date of Patent: Jan. 21, 2020

(54) BODY FLIGHT SIMULATOR

(71) Applicant: Antonio Arias, IV, Guaynabo, PR (US)

(72) Inventor: Antonio Arias, IV, Guaynabo, PR (US)

(*) Notice: Subject to any disclaimer, the term of this patent is extended or adjusted under 35 U.S.C. 154(b) by 0 days.

(21) Appl. No.: 16/023,098

(22) Filed: Jun. 29, 2018

(65) Prior Publication Data
US 2019/0001229 A1 Jan. 3, 2019

Related U.S. Application Data

(60) Provisional application No. 62/527,052, filed on Jun. 30, 2017.

(51) Int. Cl.
*A63G 31/00* (2006.01)
*B64D 23/00* (2006.01)
*G01N 9/00* (2006.01)

(52) U.S. Cl.
CPC ............. *A63G 31/00* (2013.01); *B64D 23/00* (2013.01); *A63G 2031/005* (2013.01)

(58) Field of Classification Search
CPC ............... A63G 31/00; A63G 2031/00; A63G 2131/002; A63G 2031/005; G01N 9/00
USPC .............. 472/49, 50, 59, 136, 137; 434/238
See application file for complete search history.

(56) References Cited

U.S. PATENT DOCUMENTS

| 4,535,983 A * | 8/1985 | De-La-Concha-Caceres ............. A63G 31/00 472/137 |
| 4,578,037 A * | 3/1986 | Macangus ............... A63G 31/00 434/247 |
| 5,209,702 A * | 5/1993 | Arenas ................... A63G 31/00 434/238 |
| 5,593,352 A | 1/1997 | Methfessel et al. |
| 7,153,136 B2 | 12/2006 | Hatlestad et al. |
| 2006/0025227 A1 * | 2/2006 | Metni .................... A63G 31/00 472/137 |

FOREIGN PATENT DOCUMENTS

| CA | 029511315 | 12/2016 |
| SU | 683171 | 3/1985 |

* cited by examiner

*Primary Examiner* — Kien T Nguyen
(74) *Attorney, Agent, or Firm* — Luis Figarella

(57) ABSTRACT

A body flight simulator of quick and efficient assembly and operation, includes the ability of having multi-flight areas to facilitate the teaching and skill building of novice users, as well as the ability for performances of experienced users. In addition, it includes easy viewing by observers, noise reduction and minimized environmental impacts. Finally, the modular nature of the components, allow for the assembly of modular arena stages, capable of having elongated/widened body flight areas.

16 Claims, 16 Drawing Sheets

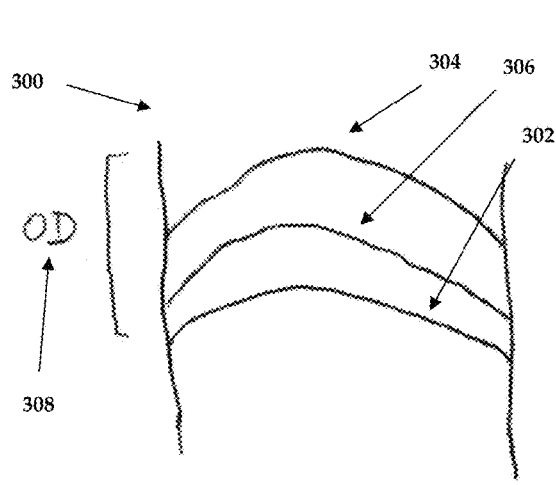
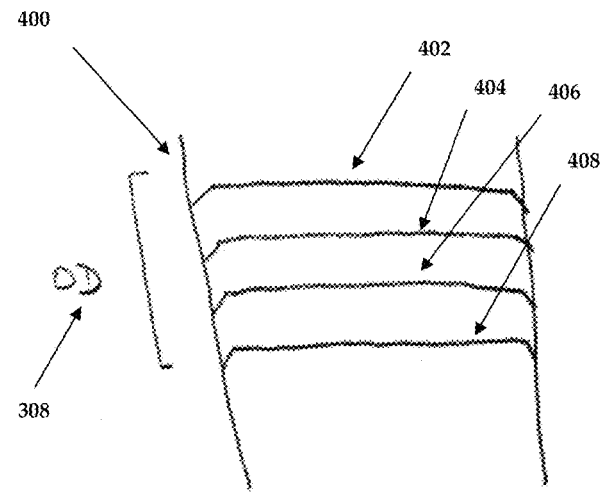
Figure 3
Figure 4
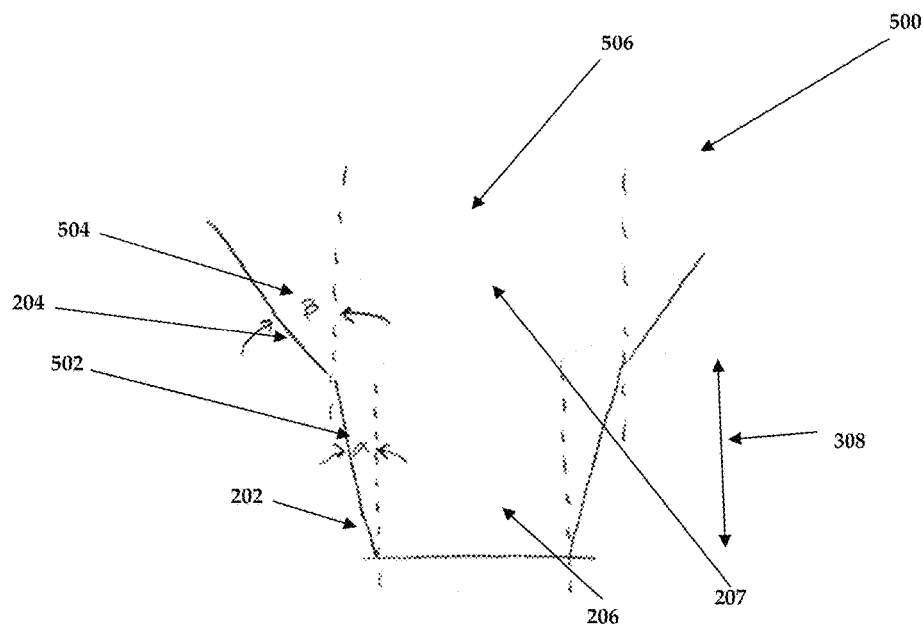
Figure 5

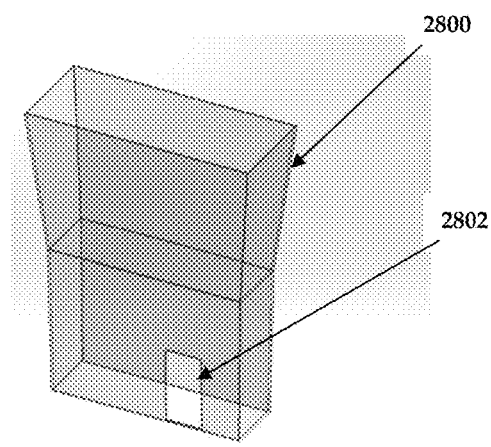
Figure 28
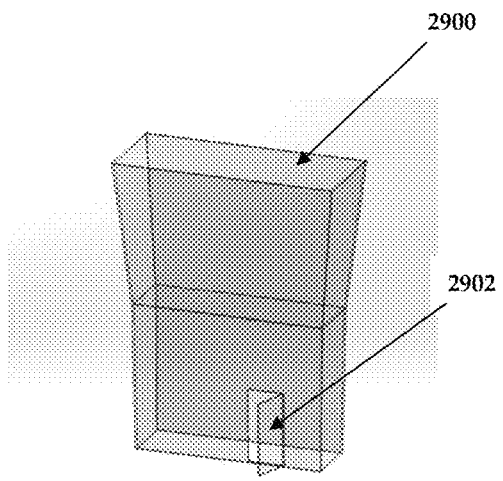
Figure 29
Figure 30
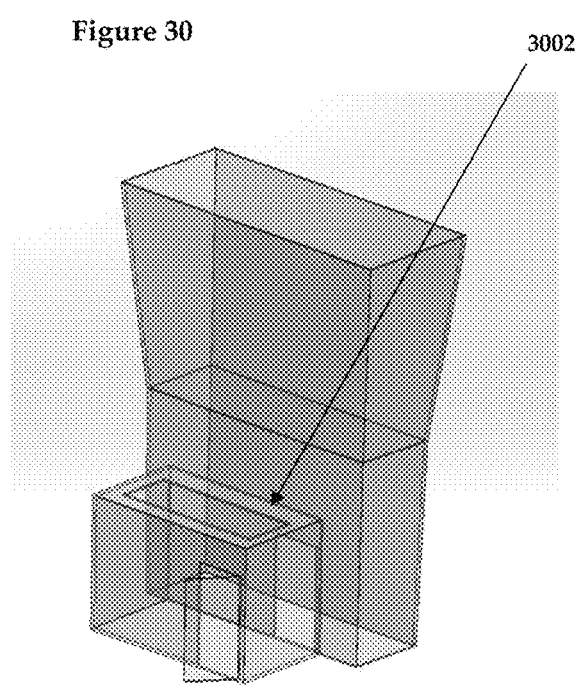
Figure 31
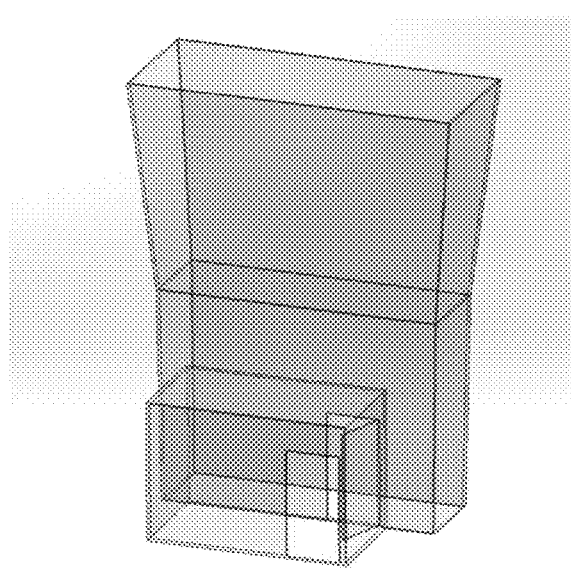

3300

BODY FLIGHT SIMULATOR

CROSS-REFERENCE TO RELATED APPLICATIONS

This application claims priority to co-pending U.S. Provisional patent application Ser. No. 62/527,052 titled "Windwork", filed on Jun. 30, 2017 the disclosure of which is herein incorporated by reference in its entirety.

PATENTS CITED

The following documents and references are incorporated by reference in their entirety, Methfessel et al (U.S. Pat. No. 5,593,352), Lenhart (U.S. Pat. No. 6,042,490), Gong (U.S. Pat. No. 7,832,265), Kitchen et al (U.S. Pat. Nos. 5,655,909 and 6,083,110), Ure (U.S. Pat. No. 6,139,439), Lodge (GB Pat. No. 919,990), Burke et al (U.S. Pat. No. 9,045,232) and Macangus et al (U.S. Pat. No. 4,578,037).

FIELD OF THE INVENTION

The present invention relates to a wind tunnel system, and specifically to a wind tunnel with applicability to function as a body flight simulation and similar activities.

DESCRIPTION OF THE RELATED ART

Indoor Skydiving is the act of floating on a vertical column of air flow. A vertical wind tunnel is used to create the vertical airflow. One or more fans or propellers creates the necessary pressure rise and volume flow while the wind tunnel itself, its structure and duct work, directs the air vertically through a flight area, bounded by the top/bottom and walls. Individuals can walk, bounce, or fall on this safety net, like a trampoline. The fans are adjusted as needed to change airspeed from zero to 300 kph (186 mph) or more. Heavier and shorter individuals need more airspeed to float while lighter and taller individuals need less airspeed to float. Individuals can float in horizontal, belly up or belly down, or vertical orientations, standing upright or upside down.

Vertical positions could require approximately 30% more airspeed than horizontal positions. A flight area with walls (also called a flight chamber, although we prefer flight area or flight envelope) has an opening, like a door frame with/without a door. Flyers enter and exit the wind tunnel through this opening, which connects the flight area and the staging area or ante chamber. The ante chamber also serves as a staging area where multiple customers (e.g. 5, 15 or more) can wait for their turn to fly while admiring/encouraging others.

Customers fly one at a time with an accompanying instructor or in groups of compatible skill level and fly for a prescribed amount of time. Multiple customers and/or groups alternate with each other until total purchased flight time has been used. The next group of customers enters the staging area and continue the same pattern. The flight deck surrounds the flight area, where customers and spectators can brief, debrief, gear up, gear down, relax, enjoy the show, and, if necessary, wait for their scheduled flight time.

Vertical wind tunnels have been re-purposed to be skydiving training and simulation facilities for years. In them, air is forced vertically within a chamber, so that a person can 'feel' the sensation of free-falling in the sky, essentially being levitated. Be they open or closed circuit, the idea is to create a current of air moving around a body that replicates the feeling of the wind that a human being encounters while hurling through the atmosphere downwards.

As in most things related to engineering, the challenge becomes one of replicating the primary forces, in a cost effective manner. Most users, particularly those that have actually skydived, find the tunnels do not provide them with the experience queues that they've become accustomed to during actual skydiving. As such, the tunnels become poor skydiving trainers.

In particular, tunnel designers and operators have failed significantly at providing relatively uniform or realistic air velocity gradients within the flight area (in effect the flight volume of the wind chamber designed for 'flight' (or fall)), both across the wind tunnel chamber, as up/down the flight/fall height. In effect, as the user moves within this volume, they should feel realistic and safe changes in flow properties (as they would if they had dropped from a plane), and not feel unrealistic and unsafe changes in flow properties horizontally and/or vertically throughout the flight area. What is needed, is a wind tunnel (either open or closed circuit) where this can be accomplished in a cost-effective fashion, resulting in a user friendly yet realistic experience.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect the invention is about a modular body flight simulation apparatus comprising a base comprised of one or more air movement modules, each said module comprised of an air intake, one or more air movement component(s), airflow deflectors and conditioner components and an air exhaust opening connected to one or more air flow transition components, a tower having two or more flight areas, each pneumatically connected to said one or more air flow transition components, each said flight area shaped by the angle of said tower walls, so that the lowest or first flight area has tower walls with an angle $\alpha$, the second lowest flight area has tower walls with an angle $\beta$, wherein $\beta$ is equal or larger than $\alpha$, and any further flight areas have tower walls with wall angles larger $\beta$ and one or more opening(s) along the perimeter of said first flight area capable of allowing access to said first flight area.

In another aspect said air movement components are comprised of one or more of the following: fans, propellers, jets and/or pressure generating devices and said airflow deflector and conditioning components are comprised of one or more of the following: vanes, wings, louvers, Airfoils, baffles, nets, screens or duct work with non-standard internal geometry and baffles. In yet another aspect one or more pneumatically porous safety components located along the length of said tower. In another aspect one or more sound reduction components in the air modules and airflow transition components and sound absorbing material within one or more of the tower walls. In yet another aspect, a sound reduction component is placed at the top of the tower. In another aspect said sound reduction component placed at the top of the tower is comprised of one of: muffler, baffles and/or sound absorption materials. In yet another aspect, said tower is topped with a platform area and one or more of said air modules have staging, seating, viewing or standing platforms attached. In yet another aspect, said base is comprised of three or more air movement modules placed alongside each so as to form an elongated, continuous arena having two or more flight areas.

Other features and advantages of the present invention will become apparent upon examining the following detailed description of an embodiment thereof, taken in conjunction with the attached drawings.

BRIEF DESCRIPTION OF THE DRAWINGS

FIGS. 3-4 show illustrations of the wind velocity vector across the operational depth of the 'fly-area' for a non-optimal Body Flight simulation system (FIG. 3) vis-à-vis the proposed Body Flight simulation system creating a realistic replication of the actual free-air skydiving experience, according to an exemplary embodiment of the invention.

FIG. 5 shows a cross section of the flight area for the Body Flight simulation System, according to an exemplary embodiment of the invention.

FIGS. 20-23 show perspective views of different arrangements of the ducts and flow conditioner components, according to exemplary embodiments of the invention.

FIGS. 28-33 show perspective views of different arrangements of flight area entries with/without doors and antechambers, according to exemplary embodiments of the invention.

Figure 1:
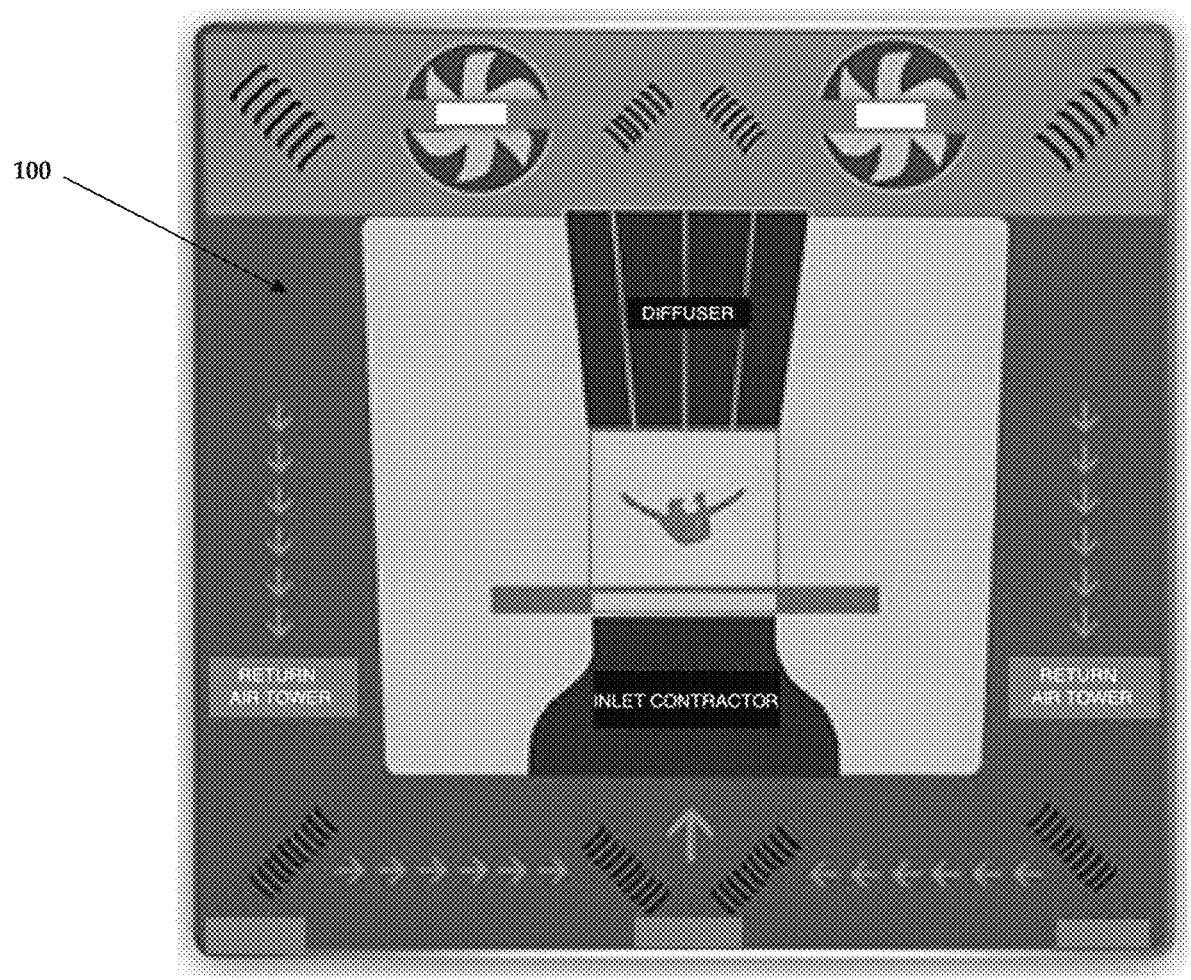
FIG. 1 shows an illustration of a closed circuit wind tunnel, according to the prior art.

The above-described and other features will be appreciated and understood by those skilled in the art from the following detailed description, drawings, and appended claims.

DETAILED DESCRIPTION OF THE PREFERRED EMBODIMENT

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the various components or modules, and/or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

While many say 'skydive' simulator, in reality the system proposed here is a body flight apparatus. In effect, body flying is technically a different feeling than skydiving as the flyer can move up and down on the vertical axis. In the sky, they can only fall slower or faster, meaning they are always moving down the vertical axis. This is an important distinction over 'skydiving simulators'. The body flight simulator conditions the air to make it feel as close as possible to real skydiving. However, since the user can go up and down the vertical axis within the flight areas of the wind tunnel, the feeling of movement is changed leading to a different sensory experience (whether evidently perceived or not). The perceived feeling of flight changes when a user can move up and down versus only down on the vertical axis.

Referring to FIG. 1 we see a 'traditional' closed-circuit dual-return wind tunnel 100, where the air is recirculated (in part or all) so that it goes around a pneumatic cavity, propelled by one or more air moving components (airfoils, propellers, wind moving casings, compressors, etc.) around one or more return paths, through one or more airflow diverting components. Such a system 100 tends to be fixed, non-portable, due primarily to the inherent design and size of the components and their interconnections.

Figure 2:
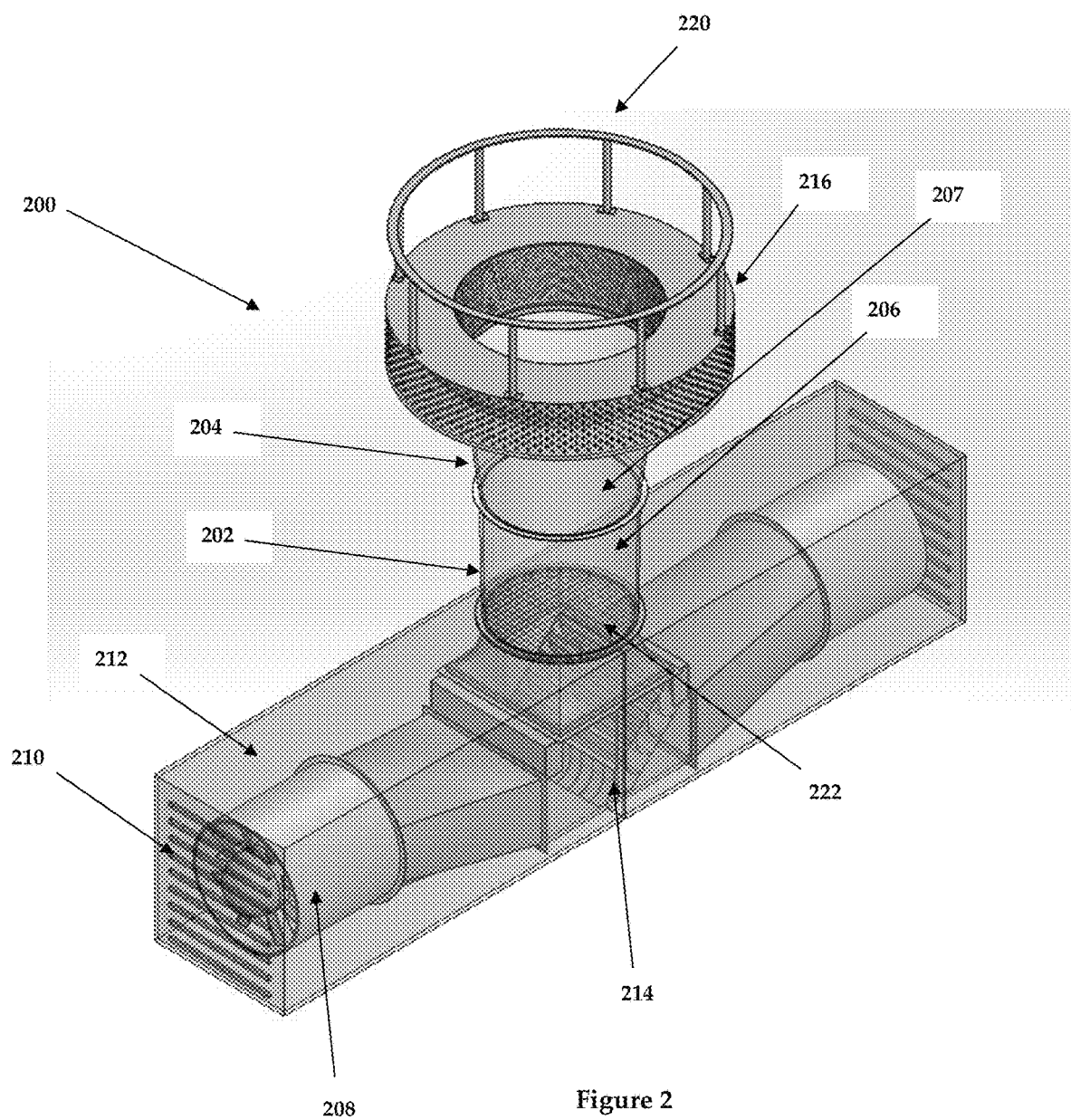
FIG. 2 shows an illustration of the proposed Body Flight Simulator in an open circuit, portable and/or deployable, dual fan version, according to an exemplary embodiment of the invention.
Figure 6:
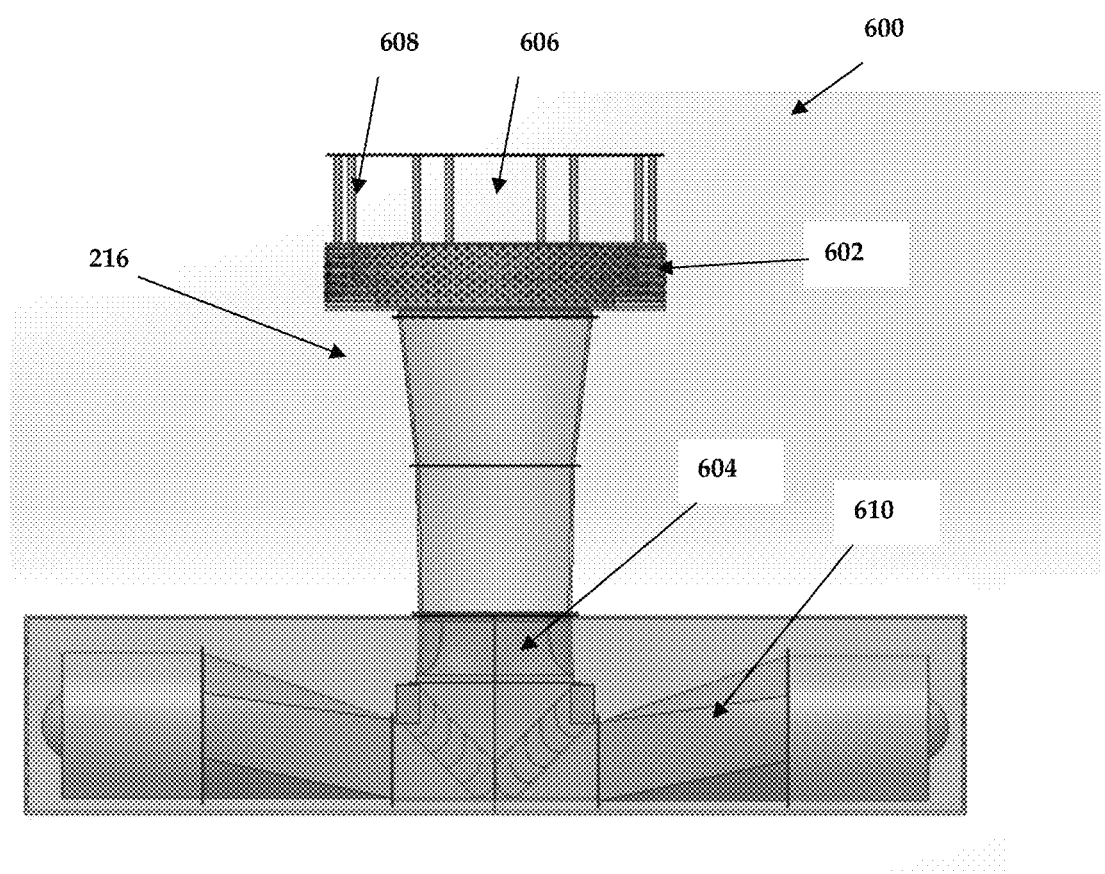
FIG. 6 shows a side view of the Body Flight simulation system, according to an exemplary embodiment of the invention.
Figure 7:
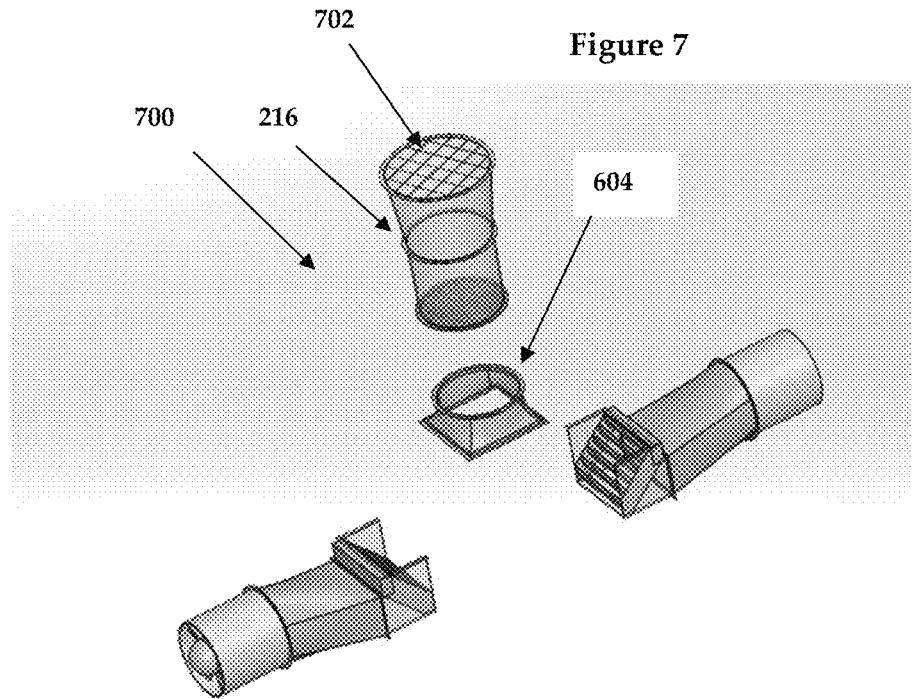
FIG. 7 shows some components of the Body Flight simulation system, according to an exemplary embodiment of the invention.
Figure 8:
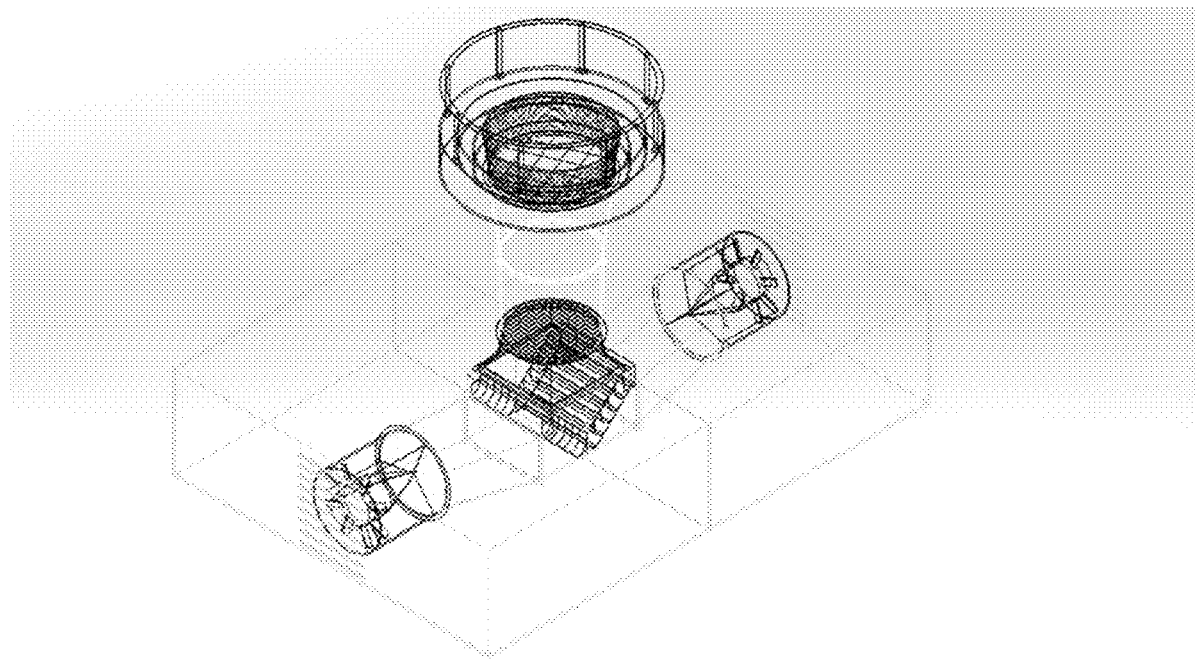
FIG. 8 shows wireframe views of various Body Flight simulation system components, according to an exemplary embodiment of the invention.
Figure 9:
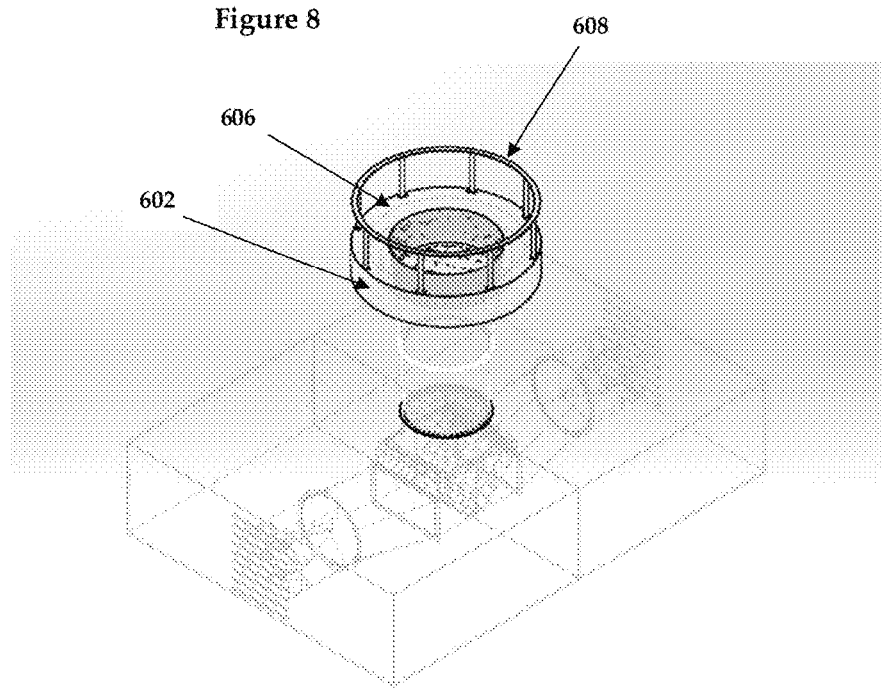
FIG. 9 shows some components of the Body Flight simulation system, according to an exemplary embodiment of the invention.
Figure 10:
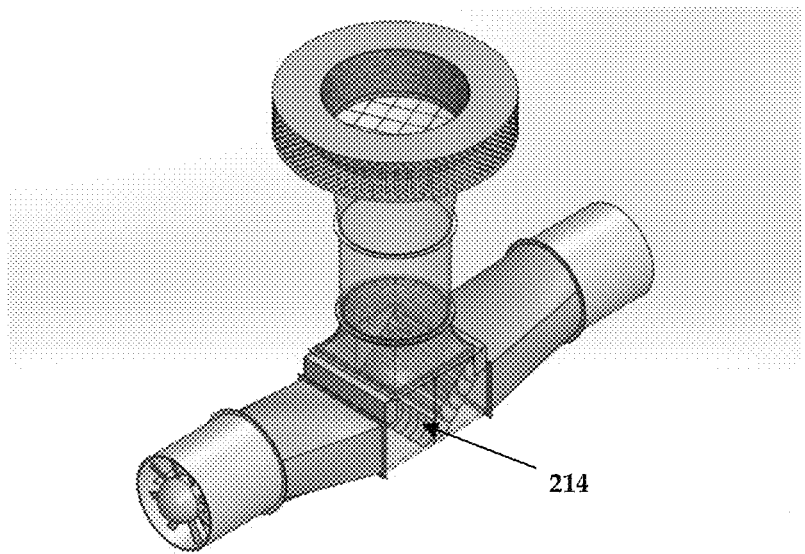
FIG. 10 shows another view of the Body Flight simulation system, according to an exemplary embodiment of the invention.
Figure 11:
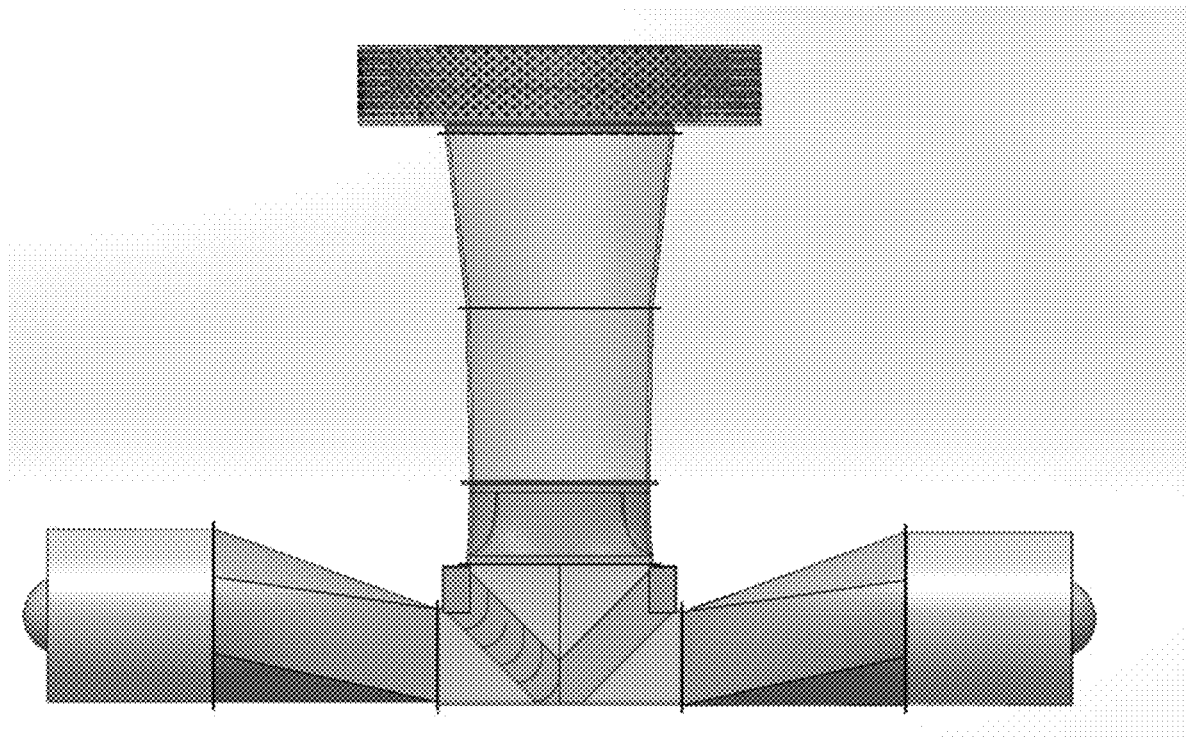
FIG. 11 shows a side view of the Body Flight simulation system, according to an exemplary embodiment of the invention.

In contrast, the proposed Body Flight simulation systems are open circuit 200 implementations, where the air is conditioned and then 'exhaled' to the open air. In one proposed embodiment FIG. 2, we see one or more air moving modules 212. These modules 212 may be comprised of one or more air moving components 208 (each may be in one embodiment propellers, air pressure generators, jet and/or fans (which may themselves be electrical or combustion engine driven), which are housed in a modularized container 212, which take air through an intake 210, use air deflector and/or conditioning component (e.g. wing, vane, louvers) 214 to direct and/or condition the air flow and proceeds to go into the tower 216 which has an opening at the other end 220. This open flow arrangement may optionally be enclosed. The enclosure may be done as a recirculation process (similar to others in the prior art, albeit with the cited advantages here), or it may be enclosed within a larger building, such as an open ended simulator (200) within a stadium, theater, arena, sports complex or similar facility.

In addition, the flight area may be with or without actual solid walls, wherein these are comprised of flexible walls, or even nets. In addition, any of the walls may be in addition to vertical, either horizontal and/or any angle in between. In one embodiment, the system is an open systems (without walls). Similarly, the flight area 206 bottom may be made of a safety net that allows the vertical air to pass through.

Note these modular air movement container 212 may be placed opposite each other, or at angles to each other (varying from 0 to 180) so they may be orthogonal or even next to each other 1600. In one embodiment, the simulator 1700 may be built with only one fan assembly 1702 and one module. In a further embodiment, an optional spare second fan 1704 serves as a spare air movement unit.

A primary advantage of the shown embodiment 200, is the inherent ability of anyone close to the facility to view easily and clearly around the modules 212, to see both flight areas 206/207 fully (i.e. with a viewing angle 360 deg. around the one or more flight areas), whether they are at ground level (where the module 212 rests), or at any higher level. This is due to the transparency of any walls 202/204 used. This is allowed in one embodiment by the clean top of the modules 212 (the air intake being capable of coming as shown on 210) as well as in other embodiments if the air intake 210 opening is moved to the top/sides/bottom of the modules 212, paired with the ability to fly shortly above the first of the safety components 222. Note that in one embodiment, we may lift the modules 212 slightly above the floor/datum, and allow for the air intake 210 to come (as stated above) from underneath the module.

Other embodiments will include platforms and/or supports which may provide a viewing area for spectators, video/photo systems, wind tunnel control and operation systems, rental gear, reception, staff facilities and/or any facilities used for operation. In another embodiment, all of the above is part of module 212. This is an innate advantage of the module 212, for the viewing platforms may be placed over or within them.

The air flow is manipulated and/or conditioned using duct work, structures and/or devices before and after the flight area that may be in the flow path. The flight area may be located above or next to the enclosure. An optional staging area or ante-chamber, may be located adjacent to the flight area and provides access to the flight area as well as an area to prepare the users. A control room where flight and machine operations are monitored and/or flow is controlled that may be in a designated area may be attached, separated or even remotely controlled. Power may be supplied by grid and/or mobile generators in a temporary or permanent condition.

The above arrangement provides commercial value in that sound is reduced (by among other modules 202, 204, 210, 212 and 216), while visibility is maximized to pedestrian and/or audience view of people in flight providing breathtaking views of flying experiences and/or performances in any required customizable arrangement. In fact, the arrangement of the airflow and airflow conditions devices (fans/louvers/etc.) below the flight deck contributes to the noise reduction. Also, a reduced sound emitting tunnel can be located in highly trafficked areas requiring lower sound emission.

Some of the above is accomplished through the positioning of the pressure rise device 208, duct 610, airflow conditioner 222, the deflectors 214 positioning, and any other flow conditioning device (like the double angle flight area) above or below the flight deck level to allow unobstructed view of the flight area. Furthermore, devices 208, 610, 222, 214 as well as all or part of the walls 202, 204, may also be made of sound insulating, absorbing materials and/or with sound absorbing features and can be contained within an enclosure such as 212 which reduces sound emission.

As the vertical air flow travels through the tower 216, in one embodiment it crosses a pneumatically porous first airflow conditioner 222, which may be a net or other porous and/or flexible surface, so that a user stands before or during flight, and falls (or 'crashes') into a softening surface. In the Body Flight simulation system, there are two or more consecutive flight areas within the tower 216. The lowest (and first) flight area 206 is formed by the walls 202 and is the one where lower skilled users are intended to operate. The homogenous airflow properties shown on (FIG. 4) apply primarily to said lowest portion of flight area 206, defined by the walls 202 with an angle $\propto$ 502. The second or upper portion of the flight area 207, have separate wall 204 angle $\beta$ 504, whose purpose is the creating of an upper flight zone 207 designed for safety and operating efficiency but also to be flyable by experienced fliers. Any higher flight area would then be angled at an ever larger angle γ 506 (Gamma), and/or successively larger angles.

The two or more flight areas or flight zones allow for the lower flight area/zone 206 to be shorter for novice flyers, yet with the addition of the upper flight area/zone 207 result in a complete flight area 206/207 which is "tall" or high enough for experienced users to thrive. Having a short lower area 206 allows an instructor to feel comfortable releasing a novice flyer to fly alone within it (which in the experience of the author) creates loud cheers and support from audiences, in result creating larger demand for experience (i.e. others wanting to use the simulator), resulting in a further entertained audience. Basically the lower area 206 is very easy to fly in and without advanced skills, it will be less likely for a novice to fly into the upper flight area 207 defined by walls 204. The design of the upper flight area 207, helps keep novice flyers safely within the lower flight area 206, one made to replicate realistic conditions.

The angle of the walls are critical, as we see in a cross section 500 of the tower 216. The first flight zone 206 is designed to have the users 'fly' in it, and has a set of walls 202 having a particular angle ∝ (ALPHA) 502 along the length of the walls 202, which form the Operational Depth 308 of the fly area 206. Above this zone 206, there is an upper flight area 207 (forming an air column 'diffuser' zone 506), formed by a second set of walls 204 which have a β (BETA) 504 angle.

In traditional wind tunnels, the flight areas 206/207 cross section (the opening as seen from above) continues to widen, and in fact appears to be this ways since it's 'the way it has always been done'. But also note, that in research wind tunnels, the test article is affixed to one location. Without significant other modification, when hosting a human, in existing wind tunnels the shape and features of the flight tower lead to faster moving air as the user moves upward vertically, and then suddenly slows when the user is entering the upper reaches. These are unrealistic and unsafe air flow conditions for any flyer.

In contrast, the lower flight area 206 is designed as close to reality as possible (for novices and/or experienced users) while the upper flight area 207 is designed for experienced users. The reason for the difference in angles, is primarily driven by a limitation on present day wind tunnels. In effect, given the change in pressures, what happens is that the air moves faster as the user moves towards upper flight area 207, which should be perceivably slower than the fly area 206.

When the above happens, the user is confused, for a fixed body position within the fly-zone 206, results in an accelerating ascent rate (versus the more realistic decelerating ascent rate. This is often interpreted by the user as an "out-of-control" feeling. This feeling causes people to "ball up" (thus losing their stability/equilibrium though this effect on their body position aerodynamics) and fall very fast to the net. In addition, this prevents the instructors from "letting people go", since they know how they'll react, resulting in the instructor having to catch the novice. In effect, the user need to learn to 'fly the simulator', not receive a simulation of the skydiving experience. The Body Flight simulation system allows you to recreate the experience of skydiving, a direct result of the ∝ 502 and β 504 angles of the walls 202, 204. Both angles may be from zero to 15 degrees (from the nominal perpendicular), with the preferred ∝ 502 angle being smaller than β 504.

Another situation that merits attendance, is that of the wind velocity vector across the fly chamber 206. In most wind tunnels, there is a significant wind velocity drop-off along the edges of the walls 300, shown in the wind speed profiles 302, 304, 306. In effect, as you float across the chamber 206, the wind speed dies, forcing you to change your body position, something that does NOT happen as you fall across the sky. In contrast, the Body Flight simulation system allows for the horizontal wind speed profiles 400 to be 'flatter' 402, 404, 406, 408.

In one embodiment, the proposed body flight system 200 is a flight area having two portions, a first flight area 206 and a second flight area 207, where the air supplied to the tower 216 from the lower portion by one or more modularized container 212 air units (or similar arrangements). One or more lateral entry openings (with or without doors, hatches, covers, etc.) are provided for direct access to said first flight area 206. In one embodiment (FIGS. 28-29), we see an opening or doorway 2802 for entering the flight area without a door 2800 and another embodiment 2900 with a door 2902. In (FIGS. 30-33) we see embodiments with an ante chamber 3002, as well with a pressure gate system 3300. These doors are used to enter and exit the ante chamber while the tunnel is in operation. Without the pressure gate system, the tunnel must be shut off every time the door is opened if the ante-chamber has significant pressure differences from the surrounding atmosphere or ambient pressure. When there are no doors, nothing matters. Finally, exterior doors of the ante chamber and pressure gate system could be in the floor or on the roof of the ante chamber. In one embodiment, users enter through a room under the flight deck. In another embodiment, we can have an ante chamber with an exterior door, no flight chamber door, and ceiling modifications as appropriate. This is basically a controlled access area that directs sound upwards but does not need to sustain pressure, such an area may have similar noise abatement properties as the rest of the system.

Figure 12:
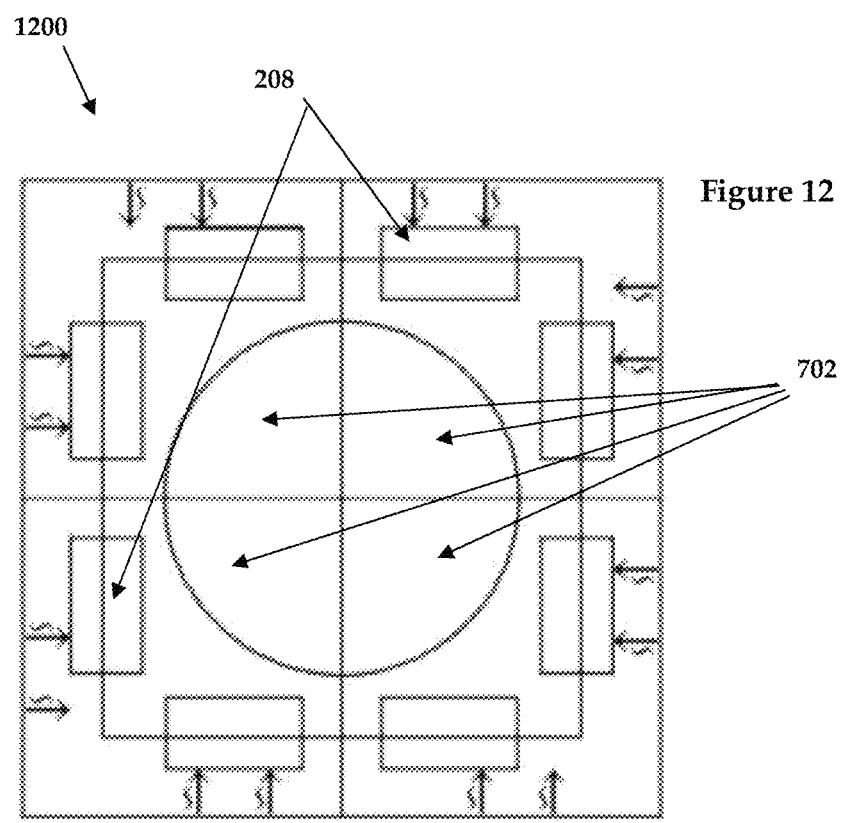
FIG. 12 shows a top view of a multi-module, arena or stadium enjoined flight area of the Body Flight simulation system, according to an exemplary embodiment of the invention.
Figure 13:
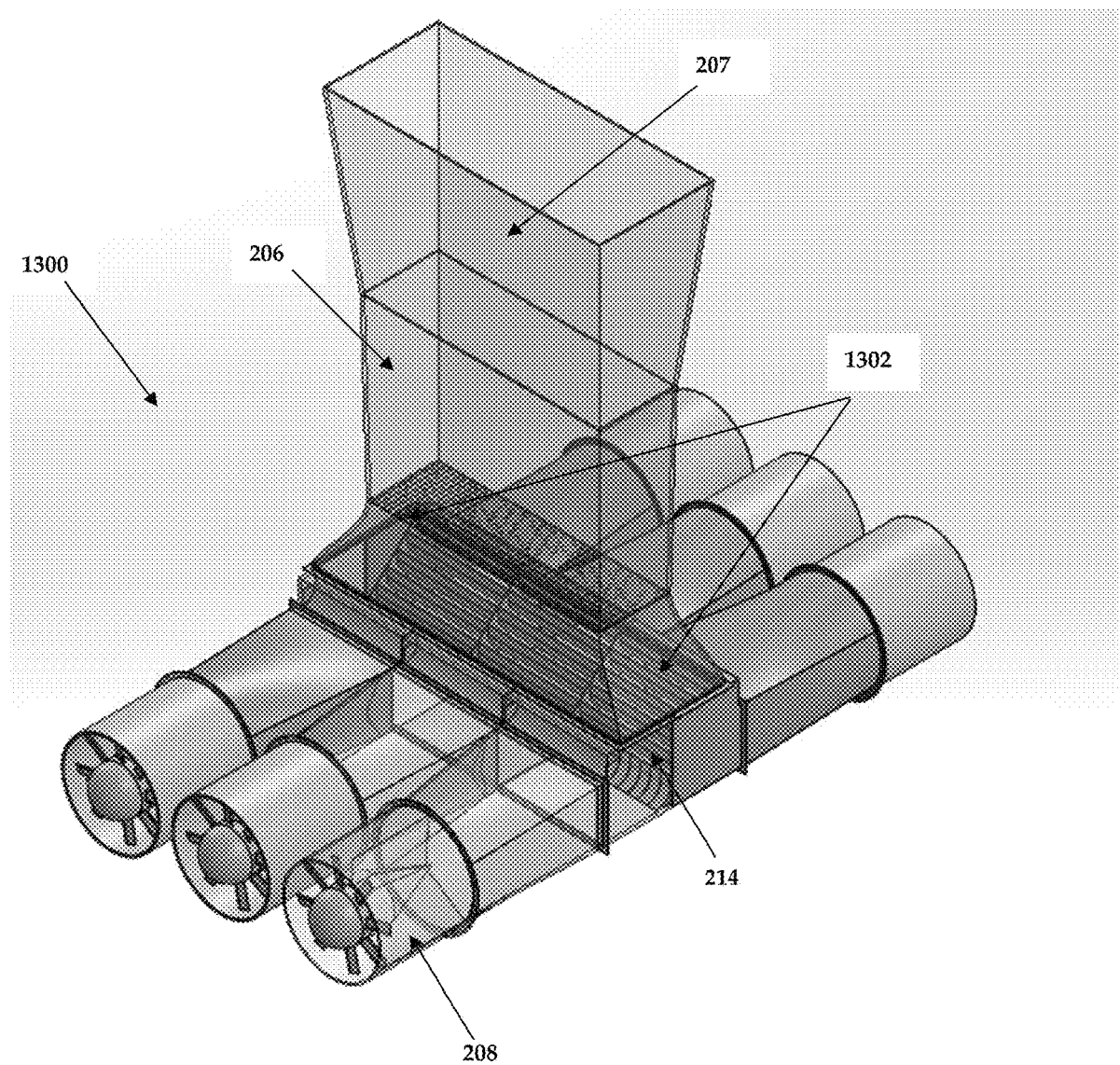
FIG. 13 shows a perspective view of the Body Flight Multi-module arena or stadium system, according to an exemplary embodiment of the invention.
Figure 14:
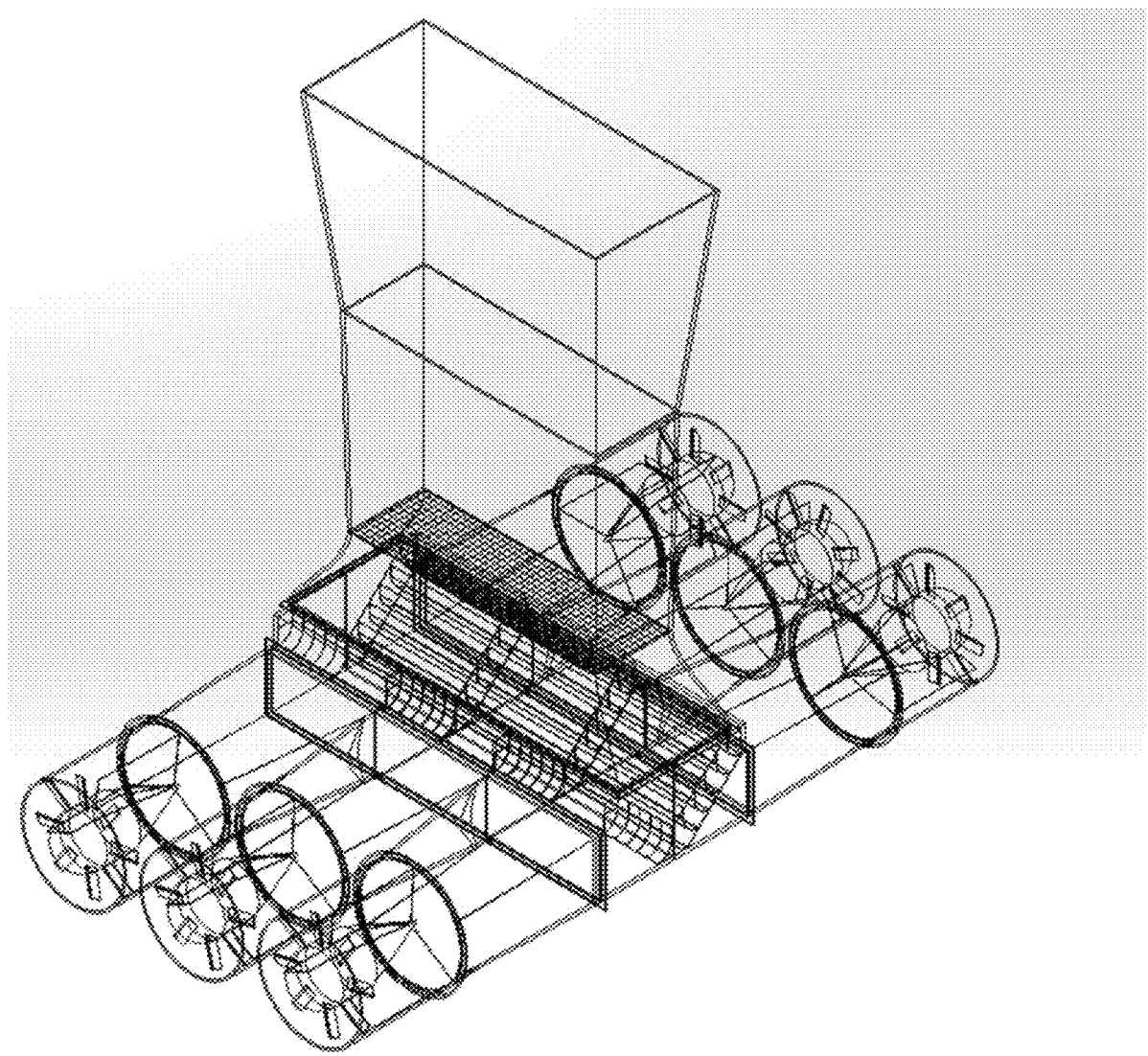
FIG. 14 shows a wireframe view of the Body Flight simulation Multi-module System components, according to an exemplary embodiment of the invention.
Figure 15:
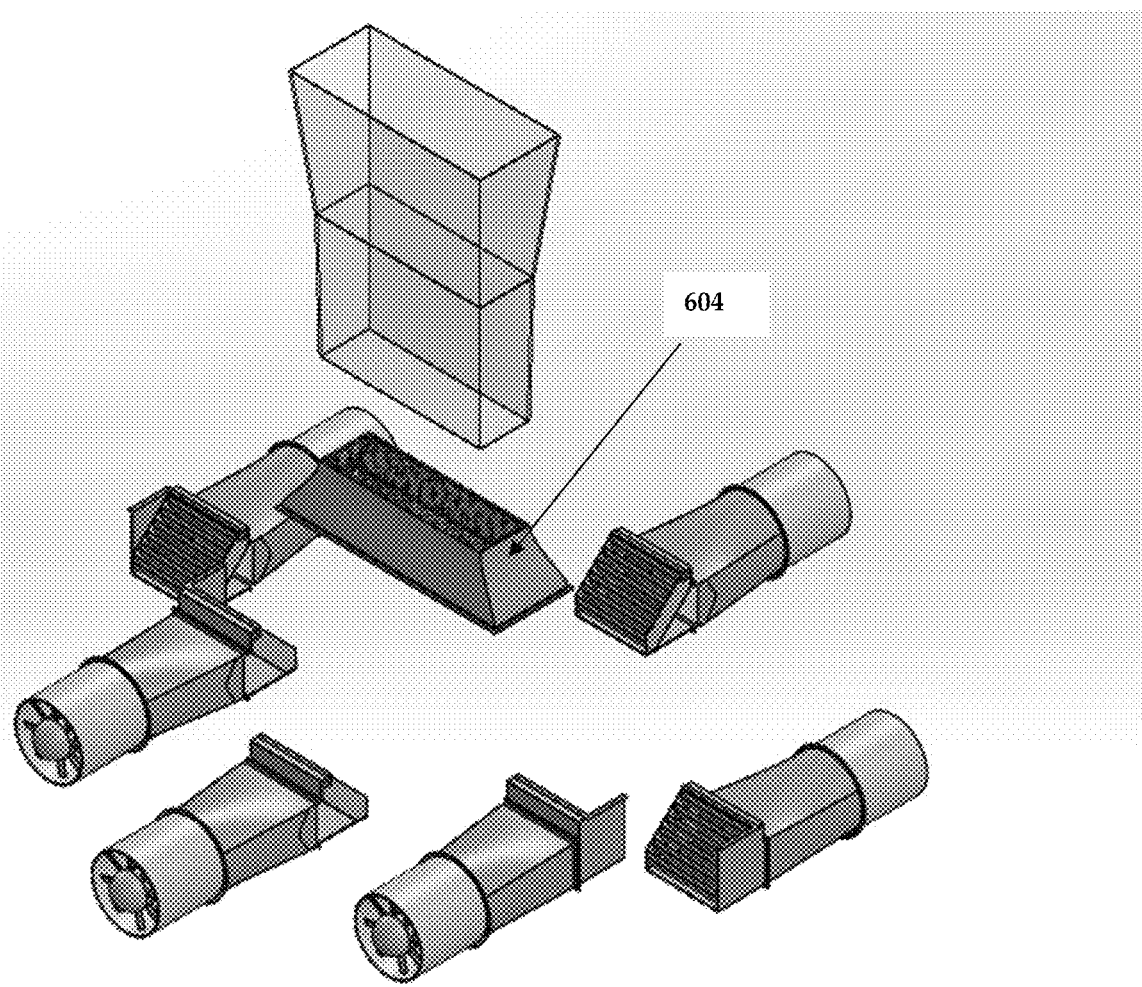
FIG. 15 shows the various components view of the Body Flight simulation Multi-module System, according to an exemplary embodiment of the invention.
Figure 16:
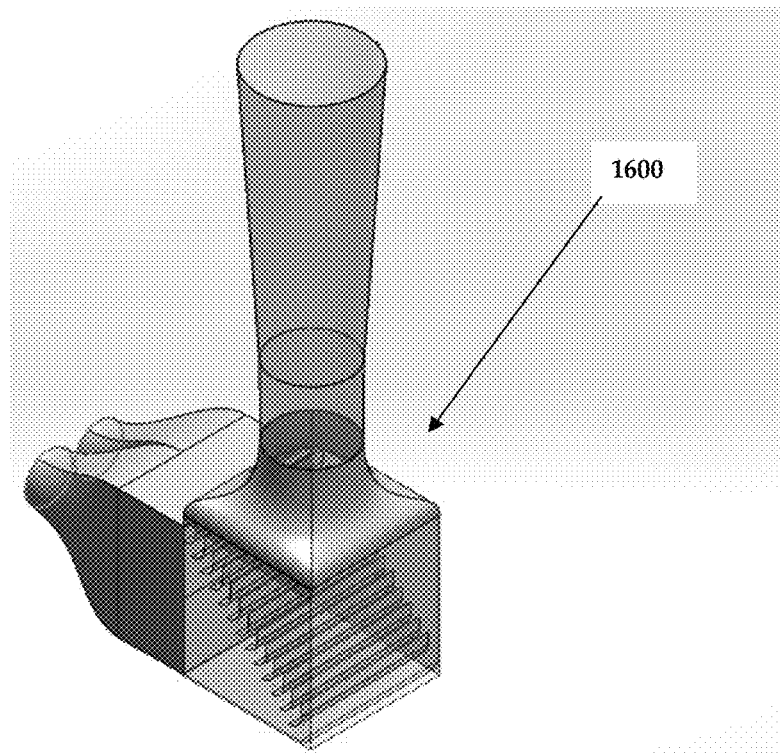
FIGS. 16-17 show two perspective views of different arrangements of the Body Flight simulation system, according to an exemplary embodiment of the invention.
Figure 17:
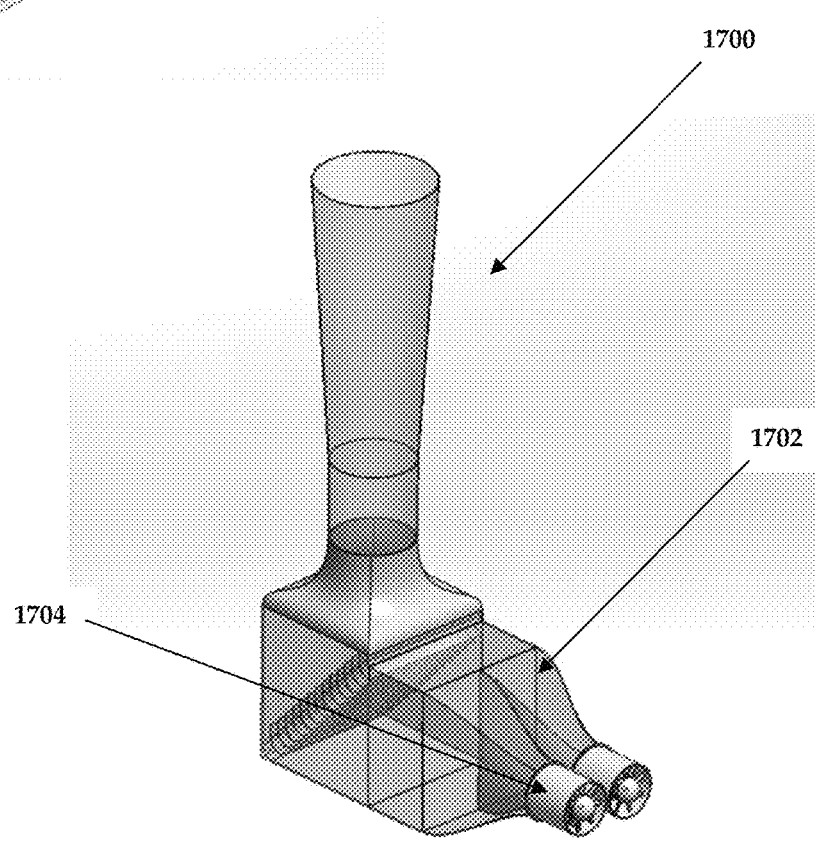

As seen in FIG. 12, the fan units 208 form a collective air pressure unit 1200 which contributes air to the entrance of the flight areas 206/207 from one or more units 208. In this fashion, a modular unit can be created, not only in the traditional square/round fashion, but along an elongated arena of length 1302 forming a larger flight volume, containing flight area 206/207 Body Flight simulation arena or multi-module system 1300. Such an arena, maybe divided spatially by one or more nets or other safety/lane demarcations.

Such a multi-module system (whether in a mobile or permanent embodiment) has the advantage of forming a continuous elongated area (be it a rectangle or a circuit shape), with continuous louvers 214, within which users may move laterally and/or vertically as part of a game, race or choreography. These louvers and other air deflecting components are formed of a flexible, semi-flexible and/or solid collection of openings and/or screens, whose length and/or diameter may be adjusted to normalize the air flow velocity profile, as well as having noise abatement portions/shapes.

The advantage of a deployable system is best seen when we look at the comparable amount of time other systems take to install. A matter of days or even hours, when compared to the months or years required by others. Note that while we mention modular, the term really applies to the components shown within them, whether in a deployable or fixed system.

A low sound emission mobile generator or fixed power source, provides enough power to run the one or more fans and all other systems. A mobile electrical transformer may be deployed if needed, connecting to nearby electrical power at a higher or lower voltage. The one or more fan(s), jets, propellers or any other suitable pressure generating devices 208 provide the required static pressure rise and volume flow. The flow is conditioned and/or manipulated throughout the flow path with nets, wire meshes, structures, stators, vanes, airfoils, sound absorbing materials, panels, and/or chambers to provide low noise, lower turbulence, and consistent horizontal and vertical cross-sectional velocity air flow to the flight area. One or more optional pneumatically porous components, including both flow conditioner 222 and/or safety components (such as a flexible floor, trampoline safety cables or safety nets) 702 are designed to be placed at/near/within said flight areas (206/207) along the length of the tower 216. These include the flow conditioning and/or manipulating section, which consists of a weave of low sound emission cabling.

The optional net for user safety that is also low sound emission cable is 702. A similar net 702 or cable assembly may also be anywhere above the lower flight area 206 to keep out of control flyers from exiting the lower flight area 206. In addition, a net may be placed at the exit 220 to prevent accidental exists from the upper flight area 207 (whether attached to the top of the hand railing 608 or nearby). The safety net keeps air flowing through with minimal obstruction, of constant cross sectional velocity, and low noise emission while providing a safety boundary and walking structure for the flyer and/or personnel. The fans, flow conditioning and/or manipulating area, and safety net are all contained within and/or support by the enclosure.

The enclosure 212 may contain sound absorbing materials and properties, supports viewing areas, gear for rental, support systems, and other necessary equipment and provisions, provides protection to electronics and other contained items from the elements or untrained personnel, provides protection to the flyers, spectators, and performers from the contained contents, provides customizable aesthetics, and contains support structures required to sustain any required loads of facilities, wind tunnel and ancillary related equipment, and/or persons.

Open air units 200 will of necessity have a significant noise foot print, both at the air entry 210 portion, as well as at the air exit 220. In one embodiment 600, a sound reduction component 602 (e.g. a muffler or sound absorption arrangement comprised of openings and baffles) is used. As seen in (FIGS. 24-27), in one embodiment (2600,2700), we note the exterior perforations 2602, which is sometimes preferred. In another embodiment (2400, 2500), there are no exterior perforations. These perforations may be made on any surface (upper, outer, lower). Alternate embodiments, with side wall perforations, are also possible.

Note that the interior baffles do not need to be as shown 2502, they could also be perforated and in reverse order. The interior walls of the silencer in one embodiment will have sound absorbing elements, materials, or geometry. Notice how the interior perforated wall 2604 is angled (this is the wall that "sees" the airflow). This angle γ 506 (Gamma) which may be equal or larger than ∝ 502 (Alpha) and/or β 504 (Beta), and may form a third or fourth (or higher) flight area.

The walls 202 and 204 may be made of a sound absorbing material, or a layer of sound absorbing material may be sandwiched and used in conjunction with standard flight chamber wall materials. Modular enclosure 212 and intake 210 are designed in a way to reduce the amount of emitted noise, as well as duct 610 and all other duct work. The materials of these devices may have sound absorbing properties or sound absorbing materials may be used, so that modular enclosure 212 and other items like duct work, structures, louvers, baffles, turning vanes have sound absorbing properties or sound absorbing materials can be added.

Figure 18:
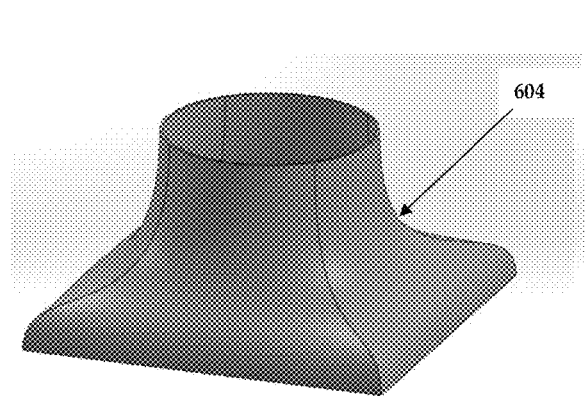
FIGS. 18-19 show two perspective views of different arrangements of the airflow transition components, according to exemplary embodiments of the invention.
Figure 19:
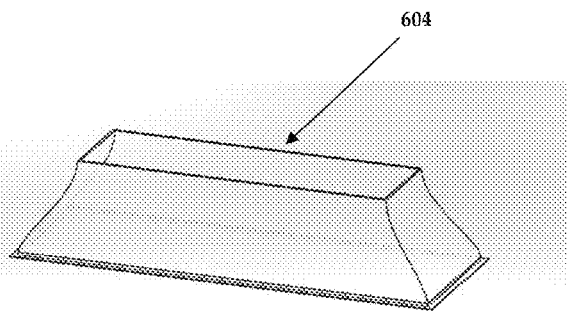

The fans 208, may have optional airflow transition components 604 (FIGS. 18-19) which are shaped to manipulate airflow. The air being blown in by the fans 208 is redirected by one or more deflectors or louvers 214. Airflow transition component 604 (e.g. a contractor or converging nozzle) follows the turning vanes or louvers 214, in order to help normalize, accelerate and condition the air flow, having an optional safety net 222 along its length. The top of the tower 216 may also be equipped with a platform 606 (having rails 608), from which the users may observe and or jump in. In one embodiment, the duct may have nets and/or airflow straighteners and/or structures along their length to condition airflow as well.

Figure 20:
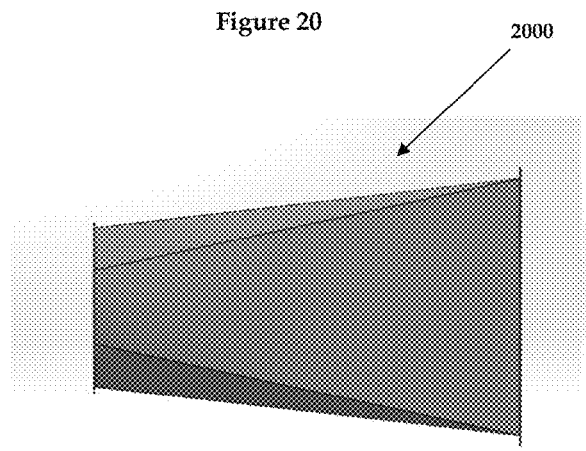
Figure 21:
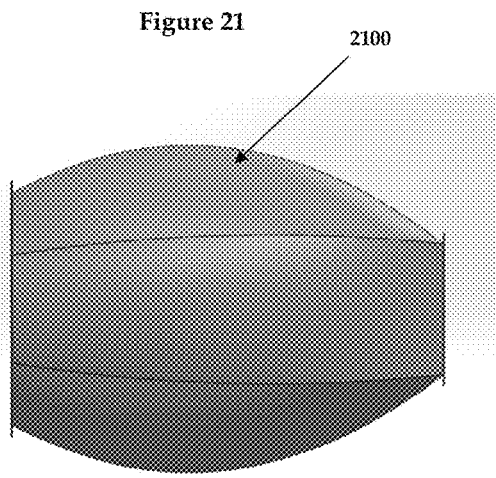
Figure 23:
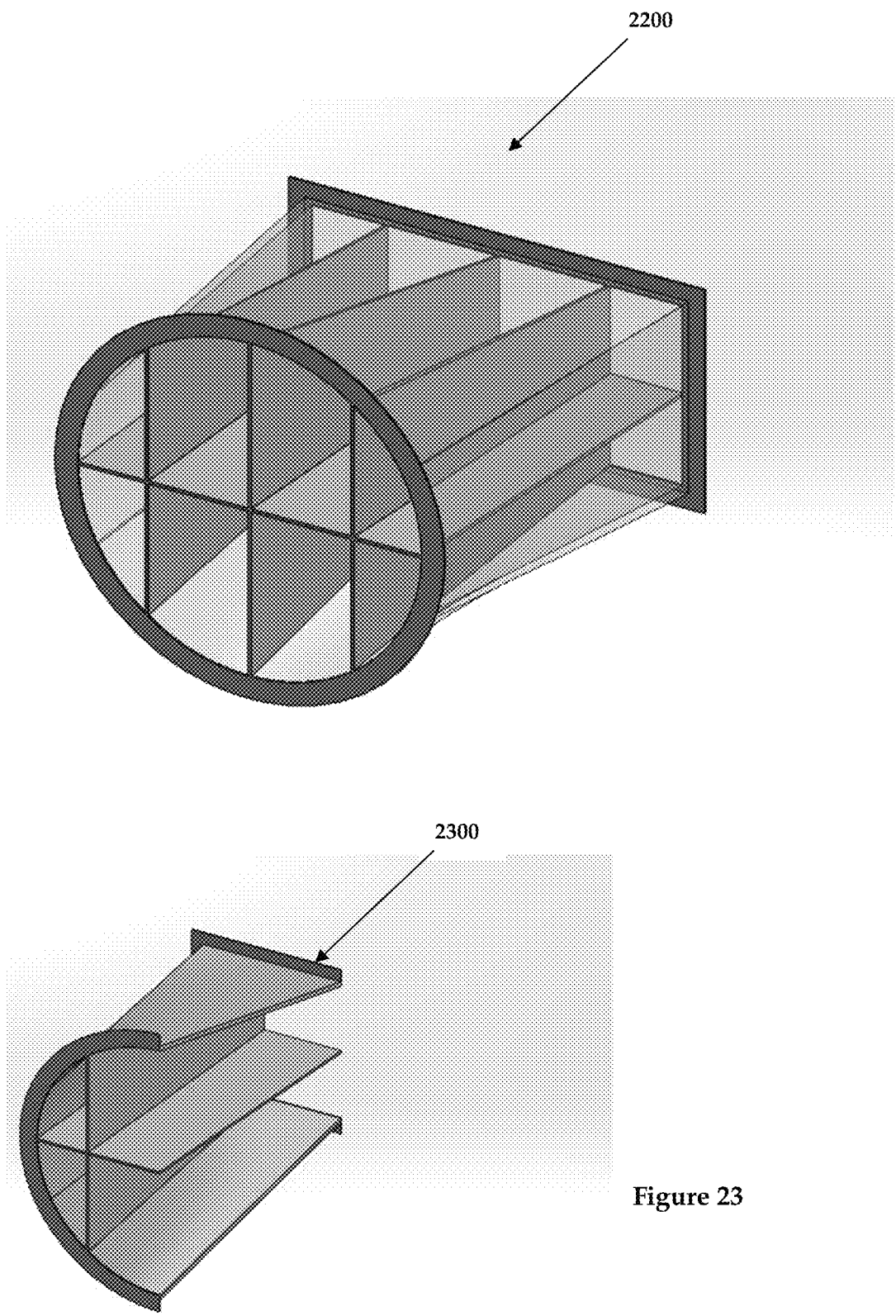
Figure 24:
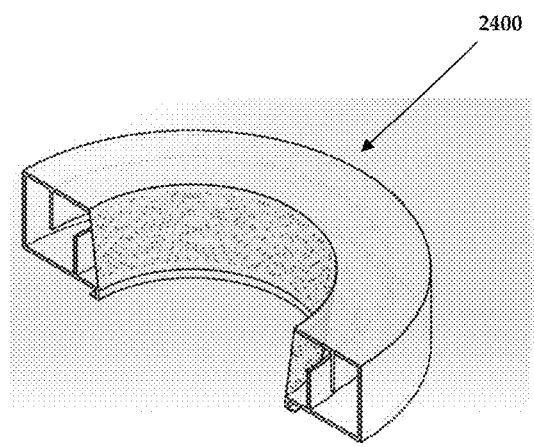
FIGS. 24-27 show perspective views of different arrangements of the muffler/noise abatement assembly at the top of the tower, according to exemplary embodiments of the invention.
Figure 25:
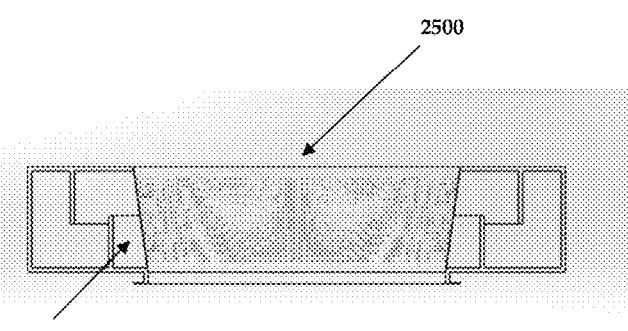
Figure 26:
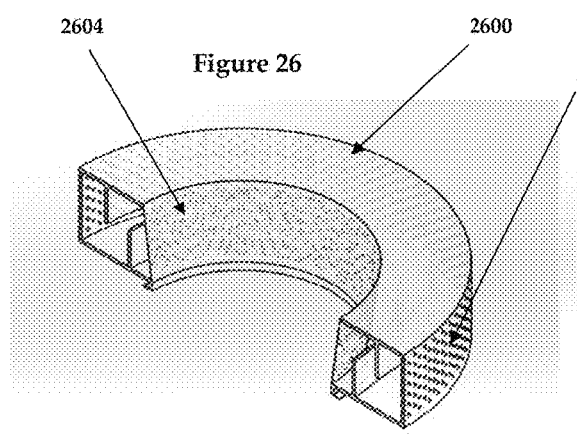
Figure 27:
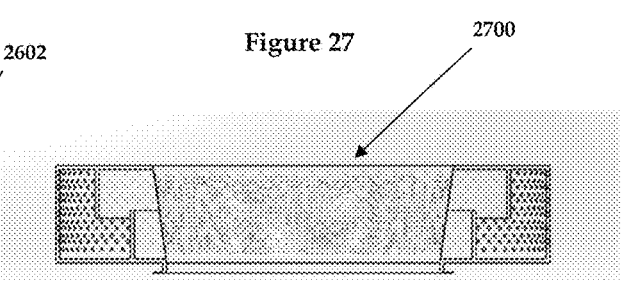
Figure 32:
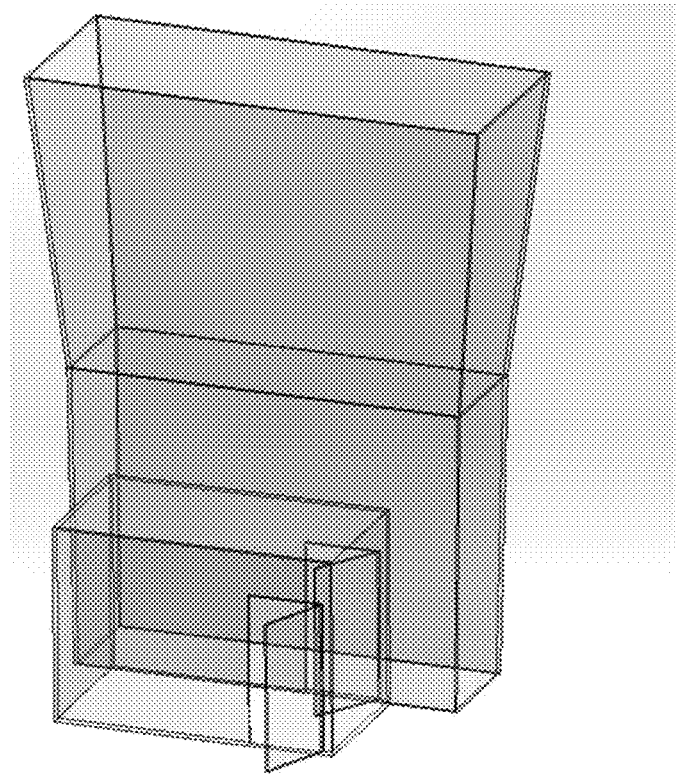
Figure 33:
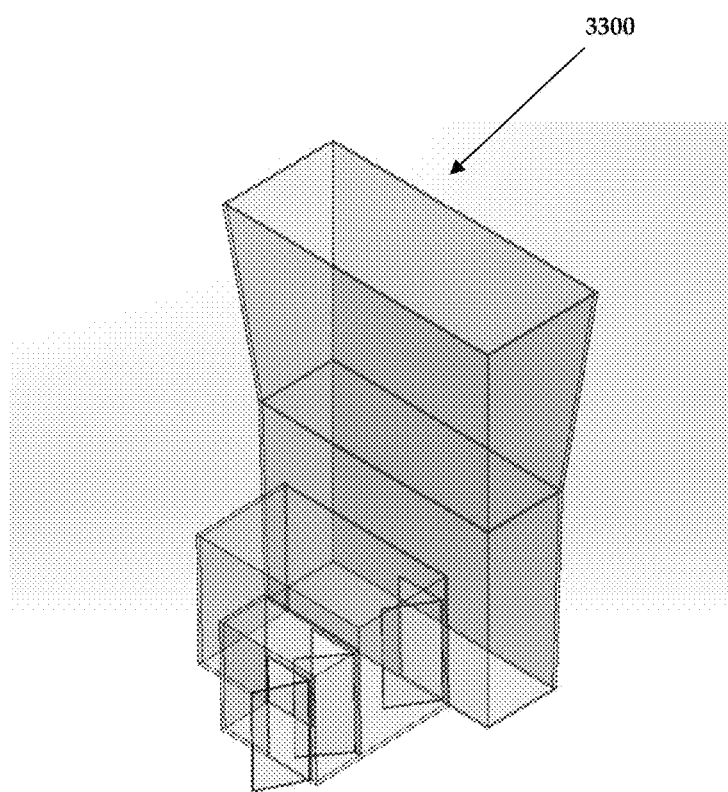

In one embodiment (FIGS. 20-22), they are diverging 2000 ducts (side view), in another they may be converging/diverging duct 2100 (side view) illustrations. In yet another embodiment, the duct has one or more flow conditioner components 2200, which may be one or more combinations of nets, baffles, screens, airfoils, etc. Note that the conditioner doesn't necessarily have to be in the duct, it may be before or after. We see a cross section 2300 of one embodiment in FIG. 23. In one embodiment, the duct 610 includes anything after the fan and before the turning vane 214.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

I claim:

1. A modular body flight simulation apparatus comprising:
   a base comprised of one or more air movement modules, each said module comprised of an air intake, one or more air movement component(s), airflow deflectors and conditioner components and an air exhaust opening connected to one or more air flow transition components;
   a tower having two or more flight areas, each pneumatically connected to said one or more air flow transition components, each said flight area shaped by the angle of said tower walls, so that the lowest or first flight area has tower walls with an angle $\alpha$, wherein said angle $\alpha$ is equal or larger than 0.5 degrees past the vertical, the second lowest flight area has tower walls with an angle $\beta$, wherein $\beta$ is larger than $\alpha$, and any further flight areas have tower walls with wall angles larger than $\beta$; and
   one or more opening(s) along the perimeter of said first flight area for allowing access to said first flight area.

2. the modular apparatus of claim 1, wherein;
   said air movement components are comprised of one or more of the following: fans, propellers, jets and/or pressure generating devices; and
   said airflow deflector and conditioning components are comprised of one or more of the following: vanes, wings, louvers, Airfoils, baffles, nets, screens or duct work with non-standard internal geometry and baffles; and
   said tower is topped with a platform area for potential staging, seating or viewing.

3. The modular apparatus of claim 2, further comprising;
   one or more pneumatically porous components located along the length of said tower.

4. The modular apparatus of claim 3, further comprising;
   one or more sound reduction components in the air modules and airflow transition components; and
   sound absorbing material within one or more of the tower walls.

5. The modular apparatus of claim 4, further comprising;
   a sound reduction component placed at the top of the tower.

6. The modular apparatus of claim 5, wherein;
   said sound reduction component placed at the top of the tower is comprised of one of: muffler, baffles and/or sound absorption materials.

7. The modular apparatus of claim 6, wherein;
   one or more of said air modules have staging, seating, viewing or standing platforms attached.

8. The modular apparatus of claim 3, wherein;
   one or more of said air modules have staging, seating, viewing or standing platforms attached.

9. The modular apparatus of claim 1, wherein;
   said base is comprised of three or more air movement modules placed alongside each so as to form an elongated, continuous arena having two or more flight areas; and
   said tower is topped with a platform area for potential staging, seating or viewing.

10. The modular apparatus of claim 9, wherein;
    said air movement components are comprised of one or more of the following: fans, propellers, jets and/or pressure generating devices; and
    said airflow deflector and conditioning components are comprised of one or more of the following: vanes, wings, louvers, Airfoils, baffles, nets, screens or duct work with non-standard internal geometry and baffles.

11. The modular apparatus of claim 10, further comprising;
    one or more pneumatically porous components located along the length of said tower.

12. The modular apparatus of claim 11, further comprising;
    one or more sound reduction components in the air modules and airflow transition components; and
    sound absorbing material within one or more of the tower walls.

13. The modular apparatus of claim 12, further comprising;
    a sound reduction component placed at the top of the tower.

14. The modular apparatus of claim 13, wherein;
    said sound reduction component placed at the top of the tower is comprised of one of: muffler, baffles and/or sound absorption materials.

15. The modular apparatus of claim 14, wherein;
    one or more of said air modules have staging, seating, viewing or standing platforms attached.

16. The modular apparatus of claim 11, wherein;
    one or more of said air modules have staging, seating, viewing or standing platforms attached.

* * * * *